United States Patent
Wang et al.

(10) Patent No.: US 10,827,535 B2
(45) Date of Patent: Nov. 3, 2020

(54) NETWORK CONNECTION ESTABLISHMENT METHOD, TERMINAL DEVICE, AND NODE DEVICE

(71) Applicant: BEIJING ZHIGU RUI TUO TECH CO., LTD., Beijing (CN)

(72) Inventors: Dong Wang, Shanghai (CN); Erwu Liu, Shanghai (CN); Zhengqing Zhang, Shanghai (CN); Xinyu Qu, Shanghai (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/489,402

(22) Filed: Apr. 17, 2017

(65) Prior Publication Data
US 2017/0318060 A1 Nov. 2, 2017

(30) Foreign Application Priority Data
Apr. 27, 2016 (CN) .......................... 2016 1 0270738

(51) Int. Cl.
*H04W 76/10* (2018.01)
*H04W 84/18* (2009.01)

(52) U.S. Cl.
CPC ............ *H04W 76/10* (2018.02); *H04W 84/18* (2013.01)

(58) Field of Classification Search
CPC .............................. H04W 76/10; H04W 84/18
See application file for complete search history.

(56) References Cited

U.S. PATENT DOCUMENTS

| 7,738,504 | B1 * | 6/2010 | Deaner | G06F 13/36 370/400 |
| 8,554,912 | B1 * | 10/2013 | Reeves | G06F 21/552 709/225 |
| 2016/0119801 | A1 * | 4/2016 | Mestanov | H04W 48/06 370/252 |
| 2016/0192241 | A1 * | 6/2016 | Tseng | H04W 76/14 370/254 |

(Continued)

FOREIGN PATENT DOCUMENTS

| CN | 101141803 A | 3/2008 |
| CN | 101772023 A | 7/2010 |

(Continued)

*Primary Examiner* — Chris Parry
*Assistant Examiner* — Abderrahmen Chouat
(74) *Attorney, Agent, or Firm* — Sheppard Mullin Richter & Hampton LLP

(57) ABSTRACT

The present application provides a network connection establishment method, a terminal device, and a node device, and relates to the self-organizing network field. The method comprises: determining at least one performance parameter of a node device in a self-organizing network; and determining, according to at least the at least one performance parameter, whether to establish a network connection with the node device. According to the method, the terminal device, and the node device, whether to establish a network connection with a node device in a self-organizing network may be determined according to at least one performance parameter of the node device, which can thereby improve overall performance of the self-organizing network, and effectively avoid a problem that some node devices become a network bottleneck.

9 Claims, 7 Drawing Sheets

(56) References Cited

U.S. PATENT DOCUMENTS

2017/0071006 A1* 3/2017 Han .................. H04W 4/06
2017/0238275 A1* 8/2017 De Pasquale ..... H04W 52/0238
370/252

FOREIGN PATENT DOCUMENTS

CN 101895963 A 11/2010
CN 102724733 A 10/2012

* cited by examiner

NETWORK CONNECTION ESTABLISHMENT METHOD, TERMINAL DEVICE, AND NODE DEVICE

CROSS REFERENCE TO RELATED APPLICATION

The present application is based on and claims the benefit of priority to Chinese Application No. 201610270738.9, filed on Apr. 27, 2016, the entire contents of which are incorporated herein by reference.

TECHNICAL FIELD

The present application relates to the self-organizing network field, and in particular, to a network connection establishment method, a terminal device, and a node device.

BACKGROUND

With the rapid increase of a quantity of mobile terminals, constructing a self-organizing network among terminal devices for communication is a development trend. A common application scenario of self-organizing networks is temporary communication. For example, attendees at a meeting quickly share a file by using mobile terminals. When an accident occurs in a place and a cellular network cannot be used, a self-organizing network may also be constructed for communication.

In the prior art, nodes in the foregoing self-organizing network are considered to be the same, without considering differences of the nodes, which leads to that a terminal node with relatively poor performance functions the same as a terminal node with relatively good performance, and the node with relatively poor performance tends to become a bottleneck of the network, affecting overall performance of the network.

SUMMARY

An objective of the present application is to provide a network connection establishment method, a terminal device, and a node device.

According to a first aspect of at least one embodiment of the present application, a network connection establishment method is provided, where the method comprises:

determining at least one performance parameter of a node device in a self-organizing network; and determining, according to at least the at least one performance parameter, whether to establish a network connection with the node device.

According to a second aspect of at least one embodiment of the present application, a network connection establishment method is provided, where the method comprises:

determining at least one performance parameter of a node device in a self-organizing network;

determining at least one target performance parameter related to a network type of the self-organizing network in the at least one performance parameter; and sending the at least one target performance parameter to a terminal that is to join the self-organizing network.

According to a third aspect of at least one embodiment of the present application, a terminal device is provided, where the terminal device comprises:

a first determining module, configured to determine at least one performance parameter of a node device in a self-organizing network; and a second determining module, configured to determine, according to at least the at least one performance parameter, whether to establish a network connection with the node device.

According to a fourth aspect of at least one embodiment of the present application, a node device is provided, where the node device comprises:

a first determining module, configured to determine at least one performance parameter of the node device in a self-organizing network;

a second determining module, configured to determine at least one target performance parameter related to a network type of the self-organizing network in the at least one performance parameter; and a sending module, configured to send the at least one target performance parameter to a terminal that is to join the self-organizing network.

According to the method, the terminal device, and the node device, whether to establish a network connection with a node device in a self-organizing network may be determined according to at least one performance parameter of the node device, which can thereby improve overall performance of the self-organizing network, and effectively avoid a problem that some node devices become a network bottleneck.

DETAILED DESCRIPTION

Figure 1:
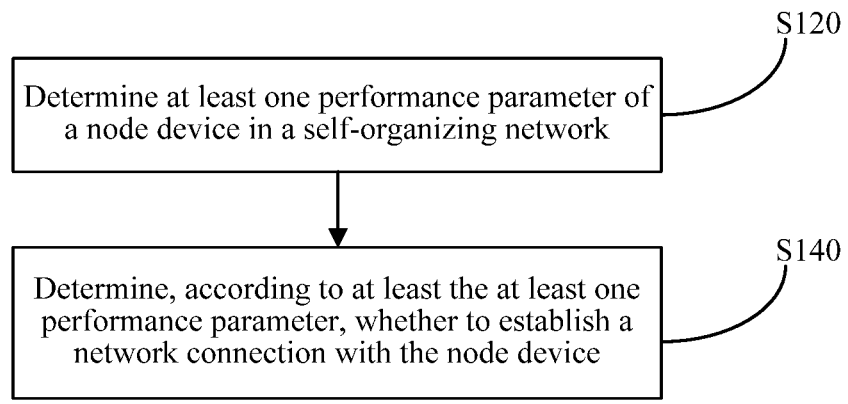
FIG. 1 is a flowchart of a network connection establishment method according to an embodiment of the present application.

Specific implementations are described in further detail below with reference to the accompanying drawings and embodiments. The following embodiments are intended to describe the present application, but not to limit the scope of the present application.

It should be understood by a person skilled in the art that in the embodiments of the present application, the value of the serial number of each step described below does not mean an execution sequence, and the execution sequence of each step should be determined according to the function and internal logic thereof, and should not be any limitation on the implementation procedure of the embodiments of the present application.

Degrees of nodes in numerous real networks, such as the Internet, a communication and transportation network, and an aviation network, obey a power-law distribution. A network with a power-law distribution means that a small portion of nodes in the network occupy numerous connections (that is, large-degree nodes). Degree values of nodes in such a network do not have a distinctive characteristic scale, and therefore the network is referred to as a scale-free network, and such a network is considered to have a scale-free characteristic.

Barabási and Albert proposed a classic scale-free network model, that is, the BA model, in 1999. In this network model, two most important mechanisms are increasement and preferentiality. Increasement means that a scale of a network keeps on increasing, that is, a quantity of nodes in the network keeps on increasing. Preferential connection mechanism means that a new-joining node in a network always tends to connect to an existing node with a relatively large degree. The two mechanisms conform to characteristics of a real network. For example, in the World Wide Web, new webpages keep on increasing, and they prefer to connect to known webpages.

A distinctive characteristic of a scale-free network is that a scale distribution characteristic remains unchanged when a network scale increases, where the scale distribution can represent a connectivity characteristic of the network, which indicates that such a network can maintain relatively good connectivity regardless of the scale of the network. Another characteristic of a scale-free network is relatively good network robustness. Compared with a stochastic network, a scale-free network can have better network connectivity, that is, have better network robustness in situations such as a node encounters a random attack (failure).

With the rapid increase of a quantity of mobile terminals, constructing a self-organizing network among terminal devices for communication is a development trend. A common application scenario of self-organizing networks is temporary communication. In the temporary communication scenario, a feature of a network topology of a self-organizing network is poor stability and fast changing. Therefore, the present invention provides a typical solution for constructing a network typology structure with a scale-free characteristic, which can improve connectivity and robustness of a self-organizing network.

FIG. 1 is a flowchart of a network connection establishment method according to an embodiment of the present application. The method may be implemented on, for example, a terminal device to join a self-organizing network. As shown in FIG. 1, the method comprises:

S120: Determine at least one performance parameter of a node device in a self-organizing network.

S140: Determine, according to at least the at least one performance parameter, whether to establish a network connection with the node device.

According to the method of the present application, whether to establish a network connection with a node device in a self-organizing network may be determined according to at least one performance parameter of the node device, which can thereby improve overall performance of the self-organizing network, and effectively avoid a problem that some node devices become a network bottleneck.

Functions of steps S120 and S140 are described in detail below with reference to specific implementations.

S120: Determine at least one performance parameter of a node device in a self-organizing network.

The node device means a device already existing in the self-organizing network. In other words, network connections have been established among the node device and other devices in the self-organizing network.

The performance parameter is a related parameter that can reflect performance of the node device, for example, may comprise at least one of a processor model, a quantity of processors, storage space, battery capacity, network bandwidth, or an operating system type of the node device. Generally, the performance parameter of the node device changes with the self-organizing network, for example, memory utilization becomes lower. A clock speed, stability, and the like of a processor may be determined according to the processor model. Generally, a higher clock speed of the processor brings a stronger calculation capability and better performance of the node device. The quantity of processors can also reflect the performance of the node device, where performance of a multi-core processor is generally better than performance of a single-core processor. The storage space may comprise space of a RAM (Random Access Memory, random access memory), space of a ROM (Read Only Memory, read only memory), and the like. Generally, larger storage space brings better performance of the node device. The battery capacity is mainly related to a battery life of the node device. Generally, larger battery capacity brings better performance of the node device. The network bandwidth is also proportional to the performance of the node device. That is, larger network bandwidth brings better performance of the node device. The network bandwidth may be determined according to a network standard used by the node device, for example, a 2G network or a 4G network. The operating system also has some effect on the performance of the node device. For example, stability of a higher-version operating system is higher than that of a lower-version operating system, and correspondingly a node device with a higher-version operating system has better performance. For another example, an iOS operating system has an advantage over an Android operating system, and correspondingly a node device with an iOS operating system has better performance.

In this step, the at least one performance parameter of the node device may be determined, for example, by directly communicating with the node device.

S140: Determine, according to at least the at least one performance parameter, whether to establish a network connection with the node device.

In an implementation, in this step, whether to establish a network connection with the node device may be determined according to only the at least one performance parameter. For example, performance of the node device may be scored according to the at least one performance parameter. If a score is higher than a threshold, it is determined to establish a network connection with the node device; otherwise, it is determined not to establish a network connection with the node device. A scoring strategy for the node device may be preset. For example, a scoring strategy with 1 point to 10 points may be set for each performance parameter. For example, if a clock speed of the processor of the node device is greater than or equal to 2.5 GHz, 10 points is given; if the clock speed is less than 2.5 GHz but greater than or equal to 2 GHz, 8 points is given; if the clock speed is less than 2 GHz but greater than or equal to 1.5 GHz, 6 points is given; and if the clock speed is less than 1.5 GHz, 1 point is given. Similarly, a scoring strategy with 1 point to 10 points may also be separately set for the storage space, the network bandwidth, and the like of the node device. Then scoring is performed separately, and a total score is calculated. It may be assumed that, if the total score is greater than 30, it is determined to establish a network connection with the node device; otherwise, it is determined not to establish a network connection with the node device.

In another implementation, step S140 may comprise:

S141: Determine at least one target performance parameter related to a network type of the self-organizing network in the at least one performance parameter.

S142: Determine, according to at least the at least one target performance parameter, whether to establish a network connection with the node device.

In this implementation, the at least one performance parameter is screened considering the network type of the self-organizing network to obtain at least one target performance parameter, and then it is determined whether to establish a network connection with the node device according to at least the at least one target performance parameter. In this way, interference of some performance parameters irrelevant to the network type may be avoided to targetedly improve overall performance of the self-organizing network.

The network type is mainly determined according to usage of the self-organizing network. For example, the network type of the self-organizing network may be classified as a file transfer type, an emergency communication type, or a wireless sensor type. Main usage of a self-organizing network of the file transfer type is transferring a file among network nodes. Generally, a relatively fast transfer speed and support of resumable data transfer are required for the self-organizing network. Mail usage of a self-organizing network of the emergency communication type is quickly establishing communication connections among network nodes. Generally, relatively high stability and interruption avoidance are required for the self-organizing network. A self-organizing network of the wireless sensor type is mainly composed of widely distributed sensor nodes, and communicates in a multi-hop forwarding manner, and generally requires relatively large battery capacity.

In step S141, the at least one target performance parameter related to the network type of the self-organizing network may be determined in the at least one performance parameter according to a preset correspondence. For example, when the network type is the file transfer type, it may be determined that network bandwidth and storage space are target performance parameters related to the network type; and when the network type is the emergency communication type, it may be determined that a processor model, a quantity of processors, and the network bandwidth are target performance parameters related to the network type.

It should be understood by a person skilled in the art that, it is hard to say that any performance parameter is entirely irrelevant to a network type. Therefore, the at least one target performance parameter related to the network type of the self-organizing network in step S141 may also be understood as a target performance parameter having relevancy greater than a preset value with the network type of the self-organizing network. A correspondence between the target performance parameter and the network type may be predetermined, for example, stored in a lookup table for calling by the method.

In step S142, whether to establish a network connection with the node device may be determined according to only the at least one target performance parameter. For example, similar to scoring the performance of the node device according to the at least one performance parameter, the performance of the node device may be scored according to the at least one target performance parameter in this implementation. If a score is higher than a second threshold, it is determined to establish a network connection with the node device; otherwise, it is determined not to establish a network connection with the node device.

In an implementation, the method may further comprise:

S110: Determine the network type of the self-organizing network.

The network type may be determined according to a user input, or may be determined according to, for example, a type label of the network type stored in the node device.

In another implementation, the method may further comprise:

S130: Determine a degree value of the node device.

Correspondingly, further, step S142 is:

S142: Determine, according to at least the at least one target performance parameter and the degree value, whether to establish a network connection with the node device.

The degree value of the node device is equal to a quantity of other node devices having established direct network connections with the node device. Generally, a larger degree value of a node device indicates a more important role of the node device in the self-organizing network. In this case, a newly joining device tends to establish a network connection with such a node device. Therefore, in an implementation, for simplicity, a score may also be given for the degree value of the node device, then addition or multiplex operation is performed on the score corresponding to the degree value and the score corresponding to the at least one target performance parameter, and whether a calculation result is great than a third threshold is determined. If the calculation result is great than the third threshold, it is determined to establish a network connection with the node device; otherwise, it is determined not to establish a network connection with the node device.

In another implementation, the method may further comprise:

S111: Determine at least one reference performance parameter and a reference degree value of another node device in the self-organizing network.

S112: Determine at least one target reference performance parameter related to the network type in the at least one reference performance parameter.

Correspondingly, step S142' may comprise:

S1421': Determine a being-selected probability of the node device according to the at least one target performance parameter, the degree value, the at least one target reference performance parameter, and the reference degree value.

S1422': Determine, according to the being-selected probability, whether to establish a network connection with the node device.

A manner in which at least one reference performance parameter of another node device is determined in step S111 is similar to a manner in which the at least one performance parameter of the node device is determined above. A performance parameter of another node device is referred to as a reference performance parameter only for a purpose of easy differentiation. Similarly, a manner in which the at least one target reference performance parameter is determined in step S112 is similar to a manner in which the at least one target performance parameter is determined above. A target performance parameter corresponding to the another node device is referred to as a target reference performance parameter herein only for differentiating the node device and the another node device.

In step S1421', in an implementation, assuming that a number of the node device is i, a performance score $C_i$ and a degree value $K_i$ of the node device with a number i may be determined according to the at least one target performance parameter, and similarly, a performance score $C_j$ and a degree value $K_j$ of a node device with a number j may be determined according to at least one target reference performance parameter of the node device with a number j. Then a being-selected probability $P_i$ of the node device may be calculated according to the following formula:

$$P_i = \frac{C_i \times K_i}{\sum_j C_j \times K_j} \tag{1}$$

Ranges of i and j are a range of numbers of node devices in a communication range of a to-join terminal device, where values of i and j may be the same or may be different. It should be understood by a person skilled in the art that, the another node device herein is referred to relative to the node device. For example, assuming that the range of numbers of the node devices in the communication range of the to-join terminal device is {2,3,5}, then when a being-selected probability of a node device with a number 2 is calculated, a node device with a number 3 or a node device with a number 5 is a corresponding another node device; whereas when a being-selected probability of the node device with a number 3 is calculated, the node device with a number 2 or the node device with a number 5 is a corresponding another node device. Further, according to the foregoing assumption, a calculation formula for a being-selected probability $P_2$ of the node device with a number 2 is as follows:

$$P_2 = \frac{C_2 \times K_2}{\sum_{j=2,3,5} C_j \times K_j} \tag{2}$$

In step S1421', whether to establish a network connection with the node device may be determined according to the being-selected probability of the node device in a random number generation manner. For example, assuming that the being-selected probability of the node device with a number 2 is 50%, then it may be assumed that a subinterval (0,0.5] is obtained by partitioning an interval (0,1], and then a random number in (0,1] is generated. If the random number falls in (0,0.5], it is determined to establish a network connection with the node device with a number 2, and if the random number does not fall in (0,0.5], it is determined not to establish a network connection with the node device with a number 2.

Considering a special case, when performance scores of node devices in a self-organizing network are the same, that is, $C_i = C_j$, the foregoing formula (1) may be simplified as:

$$P_i = \frac{K_i}{\sum_j K_j} \tag{3}$$

The formula (3) is a preferentiality probability expression for a standard BA model. In this case, the self-organizing network develops into a scale-free network, that is, a degree distribution function P(k) of the self-organizing network is:

$$P(k) = 2m^2 k^{-3} \tag{4}$$

m represents a quantity of network connections that a device desires to establish when the device accesses the self-organizing network initially, and k represents a current degree value of the device.

In the foregoing implementation, whether to establish a network connection with the node device is determined considering the network type of the self-organizing network, which brings an advantage that overall network performance of a self-organizing network for special usage can be greatly improved. For some networks without special usage, a performance score may be directly determined according to at least one performance parameter of the node device, and thereby whether to establish a network connection with the node device is determined. Specifically, in this implementation, the method may comprise:

S130'': Determine a degree value of the node device.

Correspondingly, step S140 may further comprise:

S140'': Determine, according to at least the at least one performance parameter and the degree value, whether to establish a network connection with the node device.

In this implementation, an implementation principle of step S130'' may be the same as an implementation principle of step S130, and is not described herein again.

An implementation principle of step S140'' may be similar to an implementation principle of step S142'. For example, a score may be given for the degree value of the node device, then addition or multiplex operation is performed on the score corresponding to the degree value and the score corresponding to the at least one performance parameter, and whether a calculation result is great than a fourth threshold is determined. If the calculation result is great than the fourth threshold, it is determined to establish a network connection with the node device; otherwise, it is determined not to establish a network connection with the node device.

For another example, a being-selected probability of the node device may also be calculated according to the following formula (5) similar to the foregoing formula (1), and then whether to establish a network connection with the node device is determined according to the being-selected probability.

$$P'_i = \frac{C'_i \times K_i}{\sum_j C'_j \times K_j} \tag{5}$$

$C'_i$ represents a performance score of a node device with a number i that is determined according to the at least one performance parameter, $K_i$ represents a degree value of the node device with a number i, $C'_j$ represents a performance score of a node device with a number j that is determined according to the at least one performance parameter, $K_j$ represents a degree value of the node device with a number j, and $P'_i$ represents a being-selected probability of the node device with a number i that is determined according to the at least one performance parameter and the degree value of the node device with a number i.

Generally, performance scores of node devices (the performance scores may be determined according to the at least one target performance parameter, or may be determined according to the at least one performance parameter) are different. A performance score of a node device changes with time and increasing of a network (for example, a change of available memory and a change of available power of a node device affect changing of the performance score). It can be known according to formula (1) or (5) that, a node device with a high performance score has a higher opportunity to be selected and establish a network connection. It is assumed that a node device A is selected. When the node device A has more connections, the node device A consumes more resources, for example, memory and power. Therefore, a performance score of the node device A decreases with time. Therefore, in a process of subsequent increases of a network, because the performance score of the node device A decreases, the being-selected probability of the node device A gradually decreases, and a being-selected probability of another node device gradually increases. Therefore, the foregoing process results in a balance, that is, performance scores of all node devices tend to be the same with increasing of the network. Therefore, in this case, a self-organizing network finally trends toward a scale-free self-organizing network.

In addition, an embodiment of the present application further provides a computer readable medium comprising computer readable instructions. When the computer readable instructions are executed, the operations in steps S120 and S140 of the foregoing method in the implementation shown in FIG. 1 are performed.

To sum up, according to the method of the present application, whether to establish a network connection with a node device in a self-organizing network may be determined according to at least one performance parameter of the node device, and whether to establish a network connection with the node device may further be determined considering a network type of the self-organizing network, a degree value of the node device, and the like, which can thereby improve overall performance of the self-organizing network, effectively avoid a problem that some node devices become a network bottleneck, and can cause the self-organizing network to finally trend toward a scale-free self-organizing network, and improve connectivity and robustness of the network.

Figure 2:
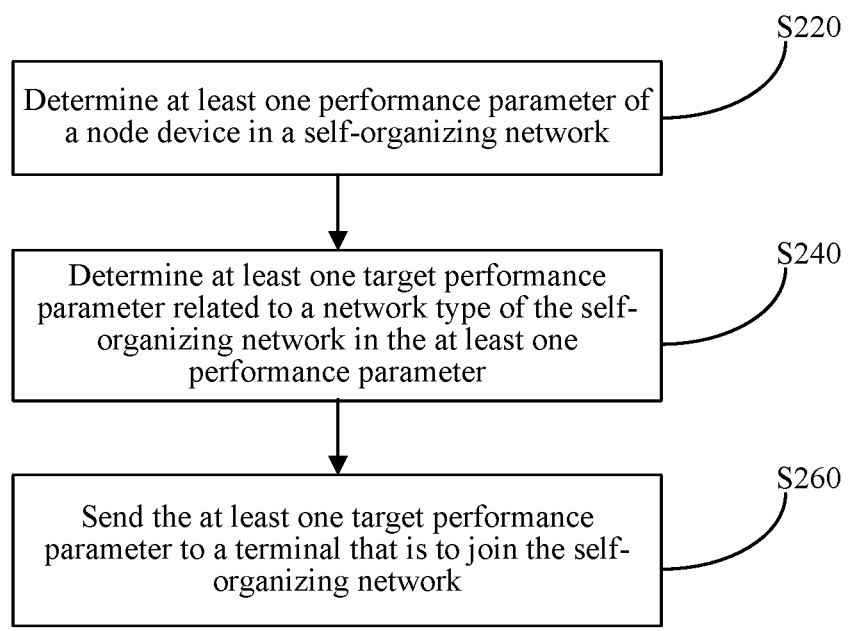
FIG. 2 is a flowchart of a network connection establishment method according to another implementation of the present application.

FIG. 2 is a flowchart of a network connection establishment method according to another embodiment of the present application. The method may be implemented on, for example, a node device in a self-organizing network. As shown in FIG. 2, the method comprises:

S220: Determine at least one performance parameter of a node device in a self-organizing network.

S240: Determine at least one target performance parameter related to a network type of the self-organizing network in the at least one performance parameter.

S260: Send the at least one target performance parameter to a terminal that is to join the self-organizing network.

According to the method of the present application, at least one target performance parameter of a node device in a self-organizing network is sent to a terminal that is to join the self-organizing network, which facilitates the terminal to select, according to the at least one target performance parameter, an appropriate node device to establish a network connection, and can thereby improve overall performance of the self-organizing network, and effectively avoid a problem that some node devices become a network bottleneck.

Functions of steps S220, S240, and S260 are described in detail below with reference to specific implementations.

S220: Determine at least one performance parameter of a node device in a self-organizing network.

The node device means a device already existing in the self-organizing network. In other words, network connections have been established among the node device and other devices in the self-organizing network.

The performance parameter is a related parameter that can reflect performance of the node device, for example, may comprise at least one of a processor model, a quantity of processors, storage space, battery capacity, network bandwidth, or an operating system type of the node device.

S240: Determine at least one target performance parameter related to a network type of the self-organizing network in the at least one performance parameter.

The network type is mainly determined according to usage of the self-organizing network. For example, the network type of the self-organizing network may be classified as a file transfer type, an emergency communication type, or a wireless sensor type. Main usage of a self-organizing network of the file transfer type is transferring a file among network nodes. Generally, a relatively fast transfer speed and support of resumable data transfer are required for the self-organizing network. Mail usage of a self-organizing network of the emergency communication type is quickly establishing communication connections among network nodes. Generally, relatively high stability and interruption avoidance are required for the self-organizing network. A self-organizing network of the wireless sensor type is mainly composed of widely distributed sensor nodes, and communicates in a multi-hop forwarding manner, and generally requires relatively large battery capacity.

In this step, the at least one target performance parameter related to the network type of the self-organizing network may be determined in the at least one performance parameter according to a preset correspondence. For example, when the network type is the file transfer type, it may be determined that network bandwidth and storage space are target performance parameters related to the network type; and when the network type is the emergency communication type, it may be determined that a processor model, a quantity of processors, and the network bandwidth are target performance parameters related to the network type.

It should be understood by a person skilled in the art that, it is hard to say that any performance parameter is entirely irrelevant to a network type. Therefore, the at least one target performance parameter related to the network type of the self-organizing network in this step may also be understood as a target performance parameter having relevancy greater than a preset value with the network type of the self-organizing network. A correspondence between the target performance parameter and the network type may be pre-determined, for example, stored in a lookup table for calling by the method.

S260: Send the at least one target performance parameter to a terminal that is to join the self-organizing network.

In this step, the at least one target performance parameter may be sent in response to a query request of the terminal, or the at least one target performance parameter may be proactively sent to the terminal.

In another implementation, the method may further comprise:

S270: Determine a degree value of the node device.

S280: Send the degree value to the terminal.

In this implementation, the degree value of the node device is additionally sent to the terminal, which can facilitate the terminal to select an appropriate node device more accurately to establish a network connection.

The degree value of the node device is equal to a quantity of other node devices having established direct network connections with the node device.

To sum up, according to the method of the present application, at least one target performance parameter and a degree value of a node device in a self-organizing network are sent to a terminal that is to join the self-organizing network, which facilitates the terminal to select, according to the at least one target performance parameter and the degree value, an appropriate node device to establish a network connection, and can thereby improve overall performance of the self-organizing network, and effectively avoid a problem that some node devices become a network bottleneck.

Figure 3:
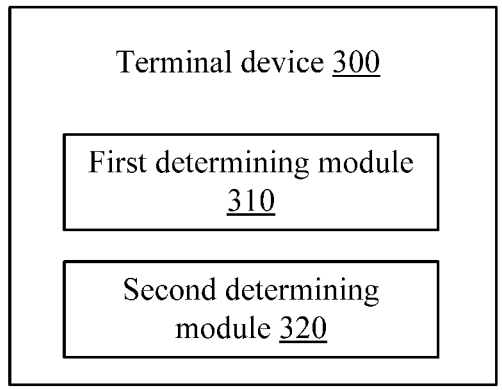
FIG. 3 is a module diagram of a terminal device according to an embodiment of the present application.

FIG. 3 is a schematic structural diagram of modules of a terminal device according to an embodiment of the present invention. The terminal device may be disposed in a user equipment as a functional module, or the terminal device may function as an individual device and implement corresponding functions by communicating with node devices in a self-organizing network. The terminal device 300 may comprise:

a first determining module 310, configured to determine at least one performance parameter of a node device in a self-organizing network; and a second determining module 320, configured to determine, according to at least the at least one performance parameter, whether to establish a network connection with the node device.

According to the terminal device of the present application, whether to establish a network connection with a node device in a self-organizing network may be determined according to at least one performance parameter of the node device, which can thereby improve overall performance of the self-organizing network, and effectively avoid a problem that some node devices become a network bottleneck.

Functions of the first determining module 310 and the second determining module 320 are described in detail below with reference to specific implementations.

The first determining module 310 is configured to determine at least one performance parameter of a node device in a self-organizing network.

The node device means a device already existing in the self-organizing network. In other words, network connections have been established among the node device and other devices in the self-organizing network.

The performance parameter is a related parameter that can reflect performance of the node device, for example, may comprise at least one of a processor model, a quantity of processors, storage space, battery capacity, network bandwidth, or an operating system type of the node device. Generally, the performance parameter of the node device changes with the self-organizing network, for example, memory utilization becomes lower. A clock speed, stability, and the like of a processor may be determined according to the processor model. Generally, a higher clock speed of the processor brings a stronger calculation capability and better performance of the node device. The quantity of processors can also reflect the performance of the node device, where performance of a multi-core processor is generally better than performance of a single-core processor. The storage space may comprise space of a RAM, space of a ROM, and the like. Generally, larger storage space brings better performance of the node device. The battery capacity is mainly related to a battery life of the node device. Generally, larger battery capacity brings better performance of the node device. The network bandwidth is also proportional to the performance of the node device. That is, larger network bandwidth brings better performance of the node device. The network bandwidth may be determined according to a network standard used by the node device, for example, a 2G network or a 4G network. The operating system also has some effect on the performance of the node device. For example, stability of a higher-version operating system is higher than that of a lower-version operating system, and correspondingly a node device with a higher-version operating system has better performance. For another example, an iOS operating system has an advantage over an Android operating system, and correspondingly a node device with an iOS operating system has better performance.

The first determining module 310 may determine the at least one performance parameter of the node device, for example, by directly communicating with the node device.

The second determining module 320 is configured to determine, according to at least the at least one performance parameter, whether to establish a network connection with the node device.

In an implementation, the second determining module 320 may determine whether to establish a network connection with the node device according to only the at least one performance parameter. For example, performance of the node device may be scored according to the at least one performance parameter. If a score is higher than a threshold, it is determined to establish a network connection with the node device; otherwise, it is determined not to establish a network connection with the node device. A scoring strategy for the node device may be preset. For example, a scoring strategy with 1 point to 10 points may be set for each performance parameter. For example, if a clock speed of the processor of the node device is greater than or equal to 2.5 GHz, 10 points is given; if the clock speed is less than 2.5 GHz but greater than or equal to 2 GHz, 8 points is given; if the clock speed is less than 2 GHz but greater than or equal to 1.5 GHz, 6 points is given; and if the clock speed is less than 1.5 GHz, 1 point is given. Similarly, a scoring strategy with 1 point to 10 points may also be separately set for the storage space, the network bandwidth, and the like of the node device. Then scoring is performed separately, and a total score is calculated. It may be assumed that, if the total score is greater than 30, it is determined to establish a network connection with the node device; otherwise, it is determined not to establish a network connection with the node device.

Figure 4:
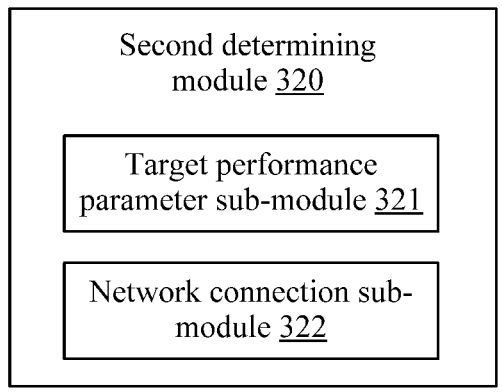
FIG. 4 is a module diagram of a second determining module according to an implementation of the present application.

In another implementation, as shown in FIG. 4, the second determining module 320 comprises:

a target performance parameter sub-module 321, configured to determine at least one target performance parameter related to a network type of the self-organizing network in the at least one performance parameter; and a network connection sub-module 322, configured to determine, according to at least the at least one target performance parameter, whether to establish a network connection with the node device.

The network type is mainly determined according to usage of the self-organizing network. For example, the network type of the self-organizing network may be classified as a file transfer type, an emergency communication type, or a wireless sensor type. Main usage of a self-organizing network of the file transfer type is transferring a file among network nodes. Generally, a relatively fast transfer speed and support of resumable data transfer are required for the self-organizing network. Mail usage of a self-organizing network of the emergency communication type is quickly establishing communication connections among network nodes. Generally, relatively high stability and interruption avoidance are required for the self-organizing network. A self-organizing network of the wireless sensor type is mainly composed of widely distributed sensor nodes, and communicates in a multi-hop forwarding manner, and generally requires relatively large battery capacity.

The target performance parameter sub-module 321 may determine, according to a preset correspondence, the at least one target performance parameter related to the network type of the self-organizing network in the at least one performance parameter. For example, when the network type is the file transfer type, it may be determined that network bandwidth and storage space are target performance parameters related to the network type; and when the network type is the emergency communication type, it may be determined that a processor model, a quantity of processors, and the network bandwidth are target performance parameters related to the network type.

It should be understood by a person skilled in the art that, it is hard to say that any performance parameter is entirely irrelevant to a network type. Therefore, the at least one target performance parameter related to the network type of the self-organizing network may also be understood as a target performance parameter having relevancy greater than a preset value with the network type of the self-organizing network. A correspondence between the target performance parameter and the network type may be predetermined, for example, stored in a lookup table for calling by the method.

The network connection sub-module 322 may determine, according to only the at least one target performance parameter, whether to establish a network connection with the node device. For example, similar to scoring the performance of the node device according to the at least one performance parameter, the performance of the node device may be scored according to the at least one target performance parameter in this implementation. If a score is higher than a second threshold, it is determined to establish a network connection with the node device; otherwise, it is determined not to establish a network connection with the node device.

Figure 5:
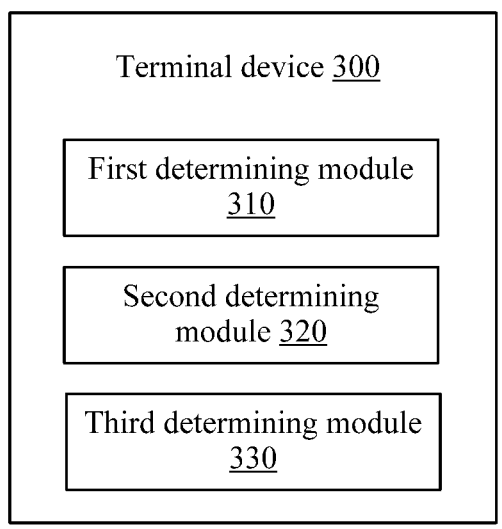
FIG. 5 is a module diagram of a terminal device according to an implementation of the present application.

In an implementation, referring to FIG. 5, the terminal device 300 further comprises:

a third determining module 330, configured to determine a degree value of the node device.

Correspondingly, the network connection sub-module 322 is configured to determine, according to at least the at least one target performance parameter and the degree value, whether to establish a network connection with the node device.

The degree value of the node device is equal to a quantity of other node devices having established direct network connections with the node device. Generally, a larger degree value of a node device indicates a more important role of the node device in the self-organizing network. In this case, a newly joining device tends to establish a network connection with such a node device. Therefore, in an implementation, for simplicity, a score may also be given for the degree value of the node device, then addition or multiplex operation is performed on the score corresponding to the degree value and the score corresponding to the at least one target performance parameter, and whether a calculation result is great than a third threshold is determined. If the calculation result is great than the third threshold, it is determined to establish a network connection with the node device; otherwise, it is determined not to establish a network connection with the node device.

Figure 6:
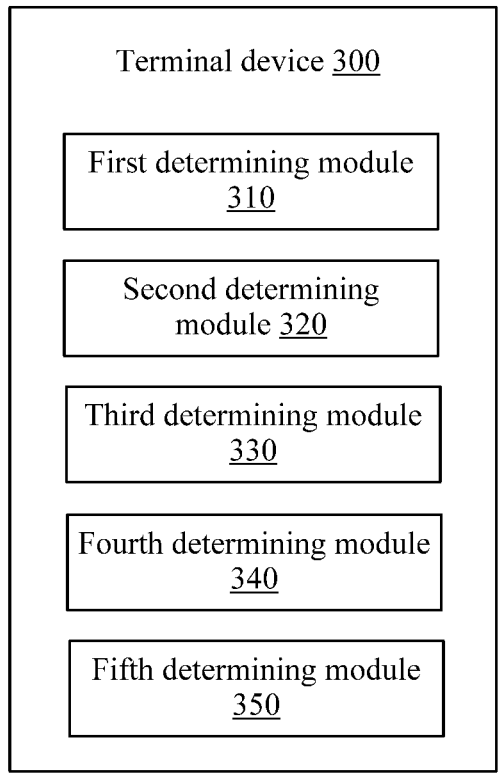
FIG. 6 is a module diagram of a terminal device according to another implementation of the present application.

In another implementation, referring to FIG. 6, the terminal device 300 further comprises:

a fourth determining module 340, configured to determine at least one reference performance parameter and a reference degree value of another node device in the self-organizing network; and a fifth determining module 350, configured to determine at least one target reference performance parameter related to the network type in the at least one reference performance parameter.

Figure 7:
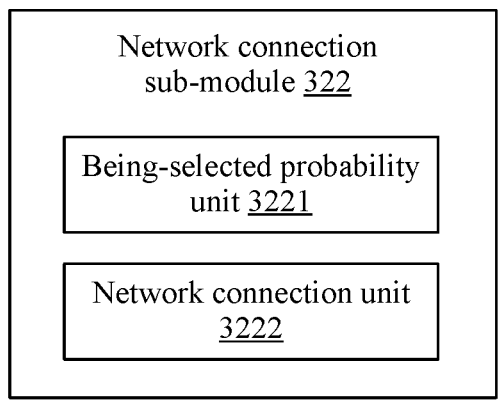
FIG. 7 is a module diagram of a network connection sub-module according to an implementation of the present application.

Correspondingly, referring to FIG. 7, the network connection sub-module 322 comprises:

a being-selected probability unit 3221, configured to determine a being-selected probability of the node device according to the at least one target performance parameter, the degree value, the at least one target reference performance parameter, and the reference degree value; and a network connection unit 3222, configured to determine, according to the being-selected probability, whether to establish a network connection with the node device.

A manner in which at least one reference performance parameter of another node device is determined is similar to a manner in which the at least one performance parameter of the node device is determined above. A performance parameter of another node device is referred to as a reference performance parameter only for a purpose of easy differentiation. Similarly, a manner in which the at least one target reference performance parameter is determined is similar to a manner in which the at least one target performance parameter is determined above. A target performance parameter corresponding to the another node device is referred to as a target reference performance parameter herein only for differentiating the node device and the another node device.

For the being-selected probability unit 3221, in an implementation, assuming that a number of the node device is i, a performance score $C_i$ and a degree value $K_i$ of the node device with a number i may be determined according to the at least one target performance parameter, and similarly, a performance score $C_j$ and a degree value $K_j$ of a node device with a number j may be determined according to at least one target reference performance parameter of the node device with a number j. Then a being-selected probability $P_i$ of the node device may be calculated according to the formula (1) above.

For the network connection unit 3222, whether to establish a network connection with the node device may be determined according to the being-selected probability of the node device in a random number generation manner. For example, assuming that a being-selected probability of a node device with a number 2 is 50%, then it may be assumed that a subinterval (0,0.5] is obtained by partitioning an interval (0,1], and then a random number in (0,1] is generated. If the random number falls in (0,0.5], it is determined to establish a network connection with the node device with a number 2, and if the random number does not fall in (0,0.5], it is determined not to establish a network connection with the node device with a number 2.

Figure 8:
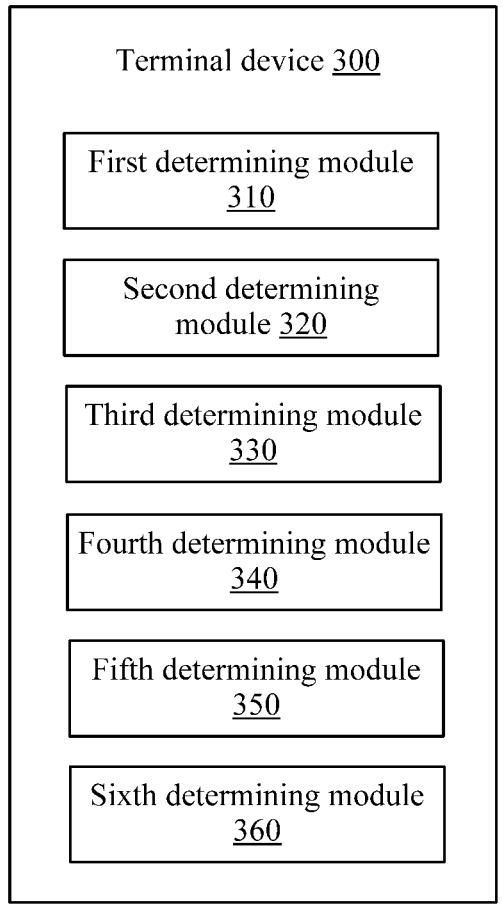
FIG. 8 is a module diagram of a terminal device according to another implementation of the present application.

In an implementation, referring to FIG. 8, when a network type of the self-organizing network is needed, the terminal device 300 may further comprise:

a sixth determining module 360, configured to determine the network type of the self-organizing network.

Figure 9:
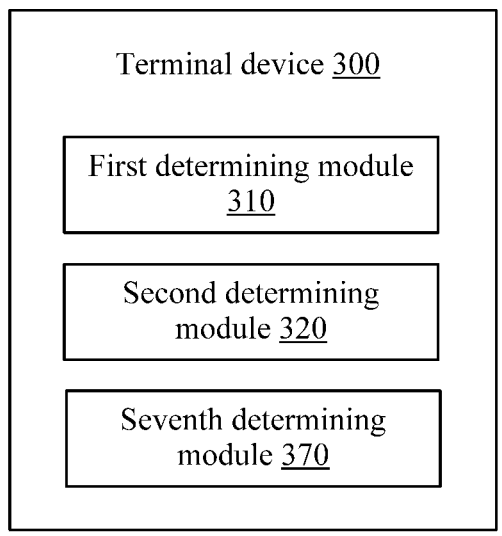
FIG. 9 is a module diagram of a terminal device according to another implementation of the present application.

In the foregoing implementation, whether to establish a network connection with the node device is determined considering the network type of the self-organizing network, which brings an advantage that overall network performance of a self-organizing network for special usage can be greatly improved. For some networks without special usage, a performance score may be directly determined according to at least one performance parameter of the node device, and thereby whether to establish a network connection with the node device is determined. Specifically, in this implementation, referring to FIG. 9, the terminal device 300 further comprises:

a seventh determining module 370, configured to determine a degree value of the node device.

Correspondingly, the second determining module 320 is configured to determine, according to at least the at least one performance parameter and the degree value, whether to establish a network connection with the node device.

In this implementation, an implementation principle of the seventh determining module 370 may be same as an implementation principle of the third determining module 330, and is not described herein again.

Correspondingly, in this implementation, an implementation principle of the second determining module 320 may be similar to an implementation principle of the foregoing implementation. For example, a score may be given for the degree value of the node device, then addition or multiplex operation is performed on the score corresponding to the degree value and the score corresponding to the at least one performance parameter, and whether a calculation result is great than a fourth threshold is determined. If the calculation result is great than the fourth threshold, it is determined to establish a network connection with the node device; otherwise, it is determined not to establish a network connection with the node device.

For another example, a being-selected probability of the node device may also be calculated according to the foregoing formula (5), and then whether to establish a network connection with the node device is determined according to the being-selected probability.

To sum up, according to the method of the present application, whether to establish a network connection with a node device in a self-organizing network may be determined according to at least one performance parameter of the node device, and whether to establish a network connection with the node device may further be determined considering a network type of the self-organizing network, a degree value of the node device, and the like, which can thereby improve overall performance of the self-organizing network, effectively avoid a problem that some node devices become a network bottleneck, and can cause the self-organizing network to finally trend toward a scale-free self-organizing network, and improve connectivity and robustness of the network.

Figure 10:
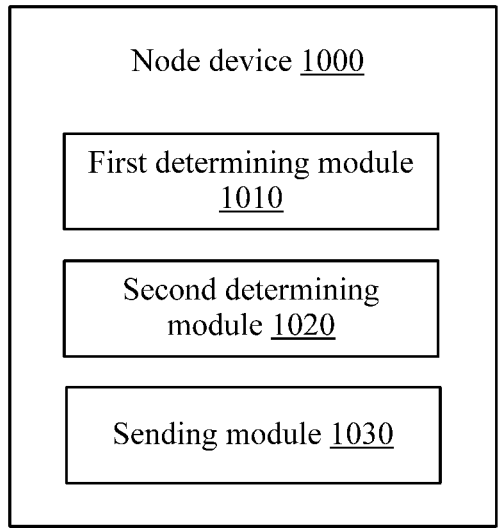
FIG. 10 is a module diagram of a node device according to another embodiment of the present application.

FIG. 10 is a schematic structural diagram of modules of a node device according to an embodiment of the present invention. The node device may be disposed in a user equipment as a functional module, or the node device may function as an individual device and implement corresponding functions by communicating with a terminal device that is to join a self-organizing network. The node device 1000 may comprise:

a first determining module 1010, configured to determine at least one performance parameter of the node device in a self-organizing network;

a second determining module 1020, configured to determine at least one target performance parameter related to a network type of the self-organizing network in the at least one performance parameter; and a sending module 1030, configured to send the at least one target performance parameter to a terminal that is to join the self-organizing network.

According to the node device of the present application, at least one target performance parameter of the node device is sent to a terminal device that is to join a self-organizing network, which facilitates the terminal device to select, according to the at least one target performance parameter, an appropriate node device to establish a network connection, and can thereby improve overall performance of the self-organizing network, and effectively avoid a problem that some node devices become a network bottleneck.

Functions of the first determining module 1010, the second determining module 1020, and the sending module 1030 are described in detail below with reference to specific implementations.

The first determining module 1010 is configured to determine at least one performance parameter of a node device in a self-organizing network.

The node device means a device already existing in the self-organizing network. In other words, network connections have been established among the node device and other devices in the self-organizing network.

The performance parameter is a related parameter that can reflect performance of the node device, for example, may comprise at least one of a processor model, a quantity of processors, storage space, battery capacity, network bandwidth, or an operating system type of the node device.

The second determining module 1020 is configured to determine at least one target performance parameter related to a network type of the self-organizing network in the at least one performance parameter.

The network type is mainly determined according to usage of the self-organizing network. For example, the network type of the self-organizing network may be classified as a file transfer type, an emergency communication type, or a wireless sensor type. Main usage of a self-organizing network of the file transfer type is transferring a file among network nodes. Generally, a relatively fast transfer speed and support of resumable data transfer are required for the self-organizing network. Mail usage of a self-organizing network of the emergency communication type is quickly establishing communication connections among network nodes. Generally, relatively high stability and interruption avoidance are required for the self-organizing network. A self-organizing network of the wireless sensor type is mainly composed of widely distributed sensor nodes, and communicates in a multi-hop forwarding manner, and generally requires relatively large battery capacity.

The at least one target performance parameter related to the network type of the self-organizing network may be determined in the at least one performance parameter according to a preset correspondence. For example, when the network type is the file transfer type, it may be determined that network bandwidth and storage space are target performance parameters related to the network type; and when the network type is the emergency communication type, it may be determined that a processor model, a quantity of processors, and the network bandwidth are target performance parameters related to the network type.

It should be understood by a person skilled in the art that, it is hard to say that any performance parameter is entirely irrelevant to a network type. Therefore, the at least one target performance parameter related to the network type of the self-organizing network in this step may also be understood as a target performance parameter having relevancy greater than a preset value with the network type of the self-organizing network. A correspondence between the target performance parameter and the network type may be predetermined, for example, stored in a lookup table for calling by the method.

The sending module 1030 is configured to send the at least one target performance parameter to a terminal that is to join the self-organizing network.

The sending module 1030 may send the at least one target performance parameter in response to a query request of the terminal, or may proactively send the at least one target performance parameter to the terminal.

Figure 11:
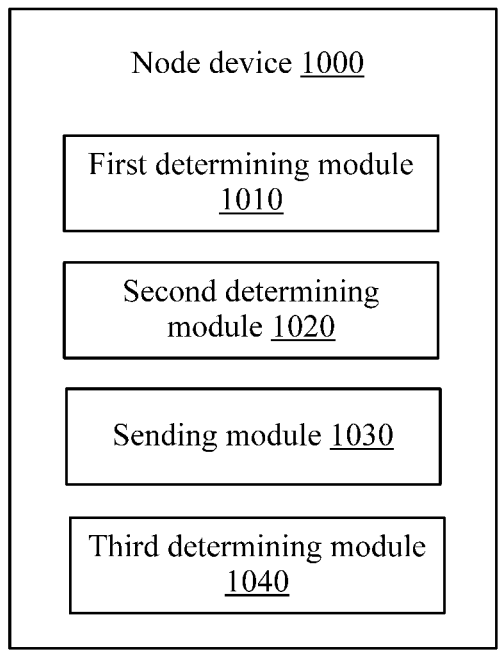
FIG. 11 is a module diagram of a node device according to an implementation of the present application.

In another implementation, referring to FIG. 11, the node device 1000 further comprises:

a third determining module 1040, configured to determine a degree value of the node device.

the sending module 1030 is further configured to send the degree value to the terminal.

In this implementation, the degree value of the node device is additionally sent to the terminal, which can facilitate the terminal to select an appropriate node device more accurately to establish a network connection.

The degree value of the node device is equal to a quantity of other node devices having established direct network connections with the node device.

To sum up, according to the node device of the present application, at least one target performance parameter and a degree value of the node device is sent to a terminal that is to join a self-organizing network, which facilitates the terminal to select, according to the at least one target performance parameter and the degree value, an appropriate node device to establish a network connection, and can thereby improve overall performance of the self-organizing network, and effectively avoid a problem that some node devices become a network bottleneck.

Figure 12:
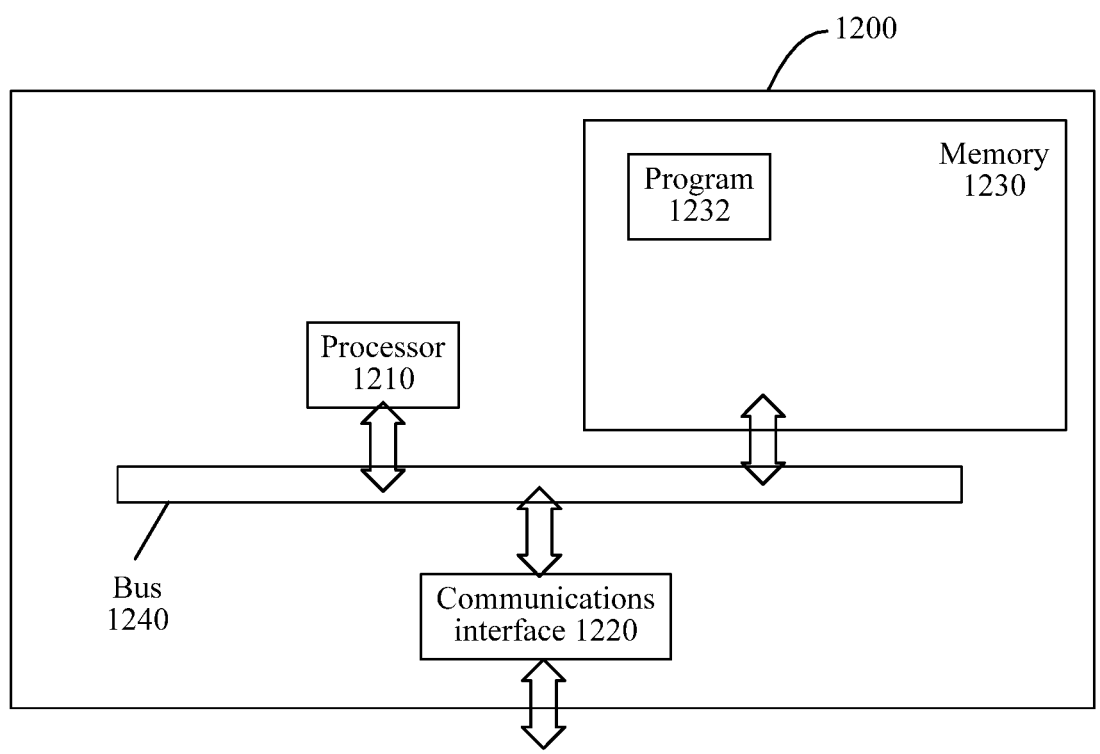
FIG. 12 is a schematic diagram of a hardware structure of a user equipment according to an embodiment of the present application.

A hardware structure of a user equipment according to an embodiment of the present application is shown in FIG. 12. Specific embodiments of the present application do not limit specific implementation of the user equipment. Referring to FIG. 12, the user equipment 1200 may comprise:

a processor (processor) 1210, a communications interface (Communications Interface) 1220, a memory (memory) 1230, and a communications bus 1240, where, the processor 1210, the communications interface 1220, and the memory 1230 communicate with each other through the communications bus 1240.

The communications interface 1220 is configured to communicate with another network element.

The processor 1210 is configured to execute a program 1232, and specifically, can perform related steps in the foregoing method embodiment shown in FIG. 1.

Specifically, the program 1232 may comprise program code, where the program code comprises computer operation instructions.

The processor 1210 may be a central processing unit CPU, or an application-specific integrated circuit ASIC (Application Specific Integrated Circuit), or one or more integrated circuits configured to implement this embodiment of the present application.

The memory 1230 is configured to store the program 1232. The memory 1230 may comprise a high-speed RAM memory, and may also comprise a non-volatile memory (non-volatile memory), for example, at least one magnetic disk storage. The program 1232 may specifically perform the following steps:

determining at least one performance parameter of a node device in a self-organizing network; and determining, according to at least the at least one performance parameter, whether to establish a network connection with the node device.

For specific implementation of the steps in the program 1232, refer to corresponding steps and modules in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

Figure 13:
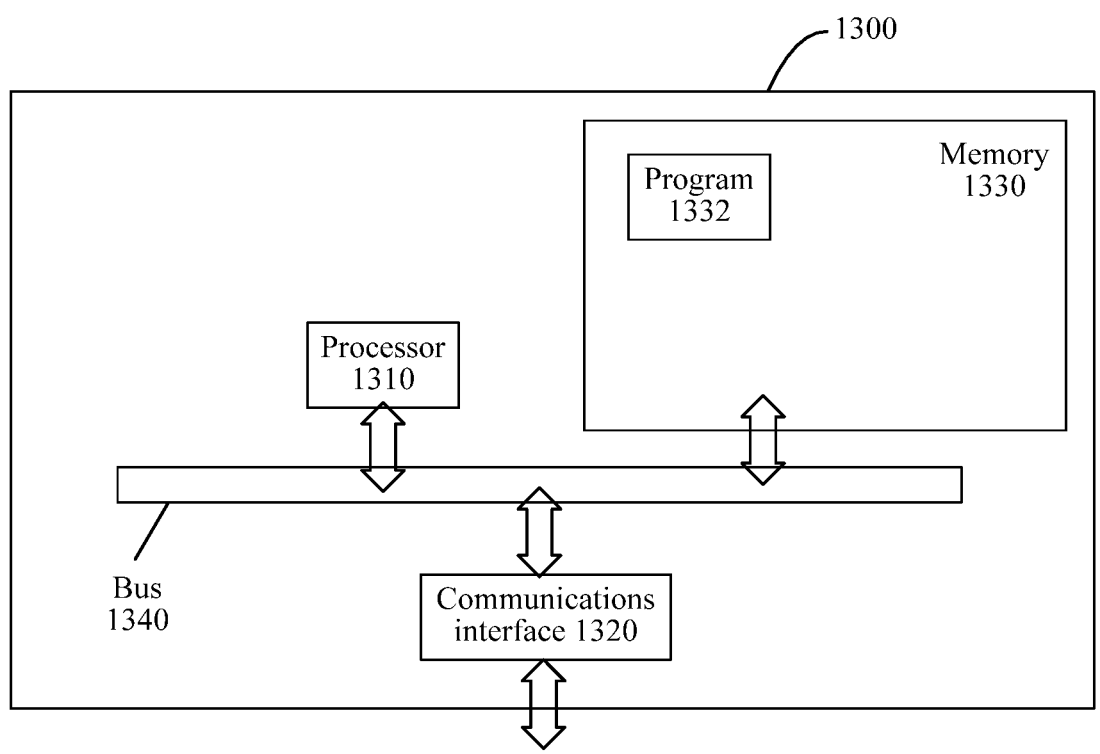
FIG. 13 is a schematic diagram of a hardware structure of a user equipment according to another embodiment of the present application.

A hardware structure of a user equipment according to another embodiment of the present application is shown in FIG. 13. Specific embodiments of the present application do not limit specific implementation of the user equipment. Referring to FIG. 13, the user equipment 1300 may comprise:

a processor (processor) 1310, a communications interface (Communications Interface) 1320, a memory (memory) 1330, and a communications bus 1340, where, the processor 1310, the communications interface 1320, and the memory 1330 communicate with each other through the communications bus 1340.

The communications interface 1320 is configured to communicate with another network element.

The processor 1310 is configured to execute a program 1332, and specifically, can perform related steps in the foregoing method embodiment shown in FIG. 1.

Specifically, the program 1332 may comprise program code, where the program code comprises computer operation instructions.

The processor 1310 may be a central processing unit CPU, or an application-specific integrated circuit ASIC (Application Specific Integrated Circuit), or one or more integrated circuits configured to implement this embodiment of the present application.

The memory 1330 is configured to store the program 1332. The memory 1330 may comprise a high-speed RAM memory, and may also comprise a non-volatile memory (non-volatile memory), for example, at least one magnetic disk storage. The program 1332 may specifically perform the following steps:

determining at least one performance parameter of a node device in a self-organizing network;

determining at least one target performance parameter related to a network type of the self-organizing network in the at least one performance parameter; and sending the at least one target performance parameter to a terminal that is to join the self-organizing network.

For specific implementation of the steps in the program 1332, refer to corresponding steps and modules in the foregoing embodiments, which are not described herein again. It may be clearly understood by a person skilled in the art that, for the purpose of convenient and brief description, reference may be made to the description of corresponding procedures in the foregoing method embodiments for detailed working procedures of the foregoing devices and modules, and details are not described herein again.

A person of ordinary skill in the art may be aware that, in combination with the examples described in the embodiments disclosed in this specification, units and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the existing art, or all or a part of the technical solutions may be implemented in the form of a software product. The software product is stored in a storage medium and comprises several instructions for instructing a computer device (which may be a personal computer, a controller, or a network device) or a processor to perform all or a part of the steps of the methods in the embodiments of the present application. The foregoing storage medium comprises: any medium that can store program code, such as a USB flash drive, a removable hard disk, a read-only memory (ROM), a random access memory (RAM), a magnetic disk, or an optical disc.

The above implementations are only used to describe the present application, rather than limit the present application; various alterations and variants can be made by those of ordinary skill in the art without departing from the spirit and scope of the present application, so all equivalent technical solutions also belong to the scope of the present application, and the scope of patent protection of the present application should be defined by claims.

What is claimed is:

1. A network connection establishment method, applied to a terminal device that is to join a self-organizing network, comprising:

determining at least one performance parameter of a node device in the self-organizing network, wherein the at least one performance parameter comprises at least one of: a processor model, a quantity of processors, storage space, and an operating system type, wherein the node device is a device already existing in the self-organizing network, and network connections have been established among the node device and other devices in the self-organizing network;

determining at least one target performance parameter related to a network type of the self-organizing network in the at least one performance parameter, wherein the network type is determined at least according to usage of the self-organizing network and is classified as a file transfer type, an emergency communication type, or a wireless sensor type;

determining a degree value of the node device;

determining at least one reference performance parameter and a reference degree value of another node device in the self-organizing network;

determining at least one target reference performance parameter related to the network type in the at least one reference performance parameter;

determining a being-selected probability of the node device according to the at least one target performance parameter, the degree value, the at least one target reference performance parameter, and the reference degree value, by the following formula:

$$P_i = \frac{C_i \times K_i}{\sum_j C_j \times K_j}$$

wherein, each of i and j is an index number of a node device, $C_i$ is a performance score of the node device with the index number i which is determined according to the at least one target performance parameter, $K_i$ is a degree value of the node device with the index number i, $C_j$ is a performance score of the node device with the index number j which is determined according to the at least one target reference performance parameter of the node device with the index number j, $K_j$ is a degree value of the node device with the index number j, and $P_i$ is a being-selected probability of the node device with the index number i; and determining, according to the being-selected probability, whether to establish a network connection between the terminal device and the node device, and establishing the network connection between the terminal device and the node device based on the determining according to the being-selected probability.

2. The method of claim 1, further comprising:
determining the network type of the self-organizing network.

3. The method of claim 1, wherein the at least one performance parameter comprises at least one of battery capacity, or network bandwidth.

4. A network connection establishment method, comprising:

determining at least one performance parameter of a node device in a self-organizing network, wherein the at least one performance parameter comprises at least one of: a processor model, a quantity of processors, storage space, and an operating system type, wherein the node device is a device already existing in the self-organizing network, and network connections have been established among the node device and other devices in the self-organizing network;

determining at least one target performance parameter related to a network type of the self-organizing network in the at least one performance parameter, wherein the network type is determined at least according to usage of the self-organizing network and is classified as a file transfer type, an emergency communication type, or a wireless sensor type;

sending the at least one target performance parameter to a terminal device that is to join the self-organizing network;

determining a degree value of the node device;

determining at least one reference performance parameter and a reference degree value of another node device in the self-organizing network;

determining at least one target reference performance parameter related to the network type in the at least one reference performance parameter;

determining a being-selected probability of the node device according to the at least one target performance parameter, the degree value, the at least one target reference performance parameter, and the reference degree value, by the following formula:

$$P_i = \frac{C_i \times K_i}{\sum_j C_j \times K_j}$$

wherein, each of i and j is an index number of a node device, $C_i$ is a performance score of the node device with the index number i which is determined according to the at least one target performance parameter, $K_i$ is a degree value of the node device with the index number i, $C_j$ is a performance score of the node device with the index number j which is determined according to the at least one target reference performance parameter of the node device with the index number j, $K_j$ is a degree value of the node device with the index number j, and $P_i$ is a being-selected probability of the node device with the index number i; and determining, according to the being-selected probability, whether to establish a network connection between the terminal device and the node device, and establishing the network connection between the terminal device and the node device based on the determining according to the being-selected probability.

5. The method of claim 4, further comprising:
sending the degree value to the terminal device.

6. A user equipment, comprising:
a memory, configured to store instructions; and
a processor, configured to execute the instructions stored in the memory, wherein the instructions, when executed, cause the processor to perform operations including:
determining at least one performance parameter of a node device in a self-organizing network which a terminal device is to join, wherein the at least one performance parameter comprises at least one of: a processor model, a quantity of processors, storage space, and an operating system type, wherein the node device is a device already existing in the self-organizing network, and network connections have been established among the node device and other devices in the self-organizing network;
determining at least one target performance parameter related to a network type of the self-organizing network in the at least one performance parameter, wherein the network type is determined at least according to usage of the self-organizing network and is classified as a file transfer type, an emergency communication type, or a wireless sensor type;
determining a degree value of the node device;
determining at least one reference performance parameter and a reference degree value of another node device in the self-organizing network;
determining at least one target reference performance parameter related to the network type in the at least one reference performance parameter;
determining a being-selected probability of the node device according to the at least one target performance parameter, the degree value, the at least one target reference performance parameter, and the reference degree value, by the following formula:

$$P_i = \frac{C_i \times K_i}{\sum_j C_j \times K_j}$$

where, each of i and j is an index number of a node device, $C_i$ is a performance score of the node device with the index number i which is determined according to the at least one target performance parameter, $K_i$ is a degree value of the node device with the index number i, $C_j$ is a performance score of the node device with the index number j which is determined according to the at least one target reference performance parameter of the node device with the index number j, $K_j$ is a degree value of the node device with the index number j, and $P_i$ is a being-selected probability of the node device with the index number i; and determining, according to the being-selected probability, whether to establish a network connection between the terminal device and the node device, and establishing the network connection between the terminal device and the node device based on the determining according to the being-selected probability.

7. The user equipment of claim 6, wherein the operations further comprise:
determining the network type of the self-organizing network.

8. A user equipment, comprising:
a memory, configured to store instructions; and
a processor, configured to execute the instructions stored in the memory, wherein the instructions, when executed, cause the processor to perform operations including:
determining at least one performance parameter of a node device in a self-organizing network, wherein the at least one performance parameter comprises at least one of: a processor model, a quantity of processors, storage space, and an operating system type, wherein the node device is a device already existing in the self-organizing network, and network connections have been established among the node device and other devices in the self-organizing network;
determining at least one target performance parameter related to a network type of the self-organizing network in the at least one performance parameter, wherein the network type is determined at least according to usage of the self-organizing network and is classified as a file transfer type, an emergency communication type, or a wireless sensor type;
sending the at least one target performance parameter to a terminal device that is to join the self-organizing network;
determining a degree value of the node device;
determining at least one reference performance parameter and a reference degree value of another node device in the self-organizing network;
determining at least one target reference performance parameter related to the network type in the at least one reference performance parameter;
determining a being-selected probability of the node device according to the at least one target performance parameter, the degree value, the at least one target reference performance parameter, and the reference degree value, by the following formula:

$$P_i = \frac{C_i \times K_i}{\sum_j C_j \times K_j}$$

where, each of i and j is an index number of a node device, $C_i$ is a performance score of the node device with the index number i which is determined according to the at least one target performance parameter, $K_i$ is a degree value of the node device with the index number i, $C_j$ is a performance score of the node device with the index number j which is determined according to the at least one target reference performance parameter of the node device with the index number j, $K_j$ is a degree value of the node device with the index number j, and $P_i$ is a being-selected probability of the node device with the index number i; and determining, according to the being-selected probability, whether to establish a network connection between the terminal device and the node device, and establishing the network connection between the terminal device and the node device based on the determining according to the being-selected probability.

9. The user equipment of claim 8, wherein the operations further comprise:

sending the degree value to the terminal device.

\* \* \* \* \*